(12) United States Patent
Inoue

(10) Patent No.: US 9,851,131 B2
(45) Date of Patent: Dec. 26, 2017

(54) COMPRESSOR AND AIR CONDITIONER HAVING THE SAME

(71) Applicant: SAMSUNG ELECTRONICS CO., LTD., Suwon-si, Gyeonggi-do (KR)

(72) Inventor: Nozomu Inoue, Osaka (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 398 days.

(21) Appl. No.: 14/537,003

(22) Filed: Nov. 10, 2014

(65) Prior Publication Data

US 2015/0132164 A1    May 14, 2015

(30) Foreign Application Priority Data

Nov. 14, 2013   (JP) .................................. 2013-235574
Jul. 23, 2014   (KR) ......................... 10-2014-0093417

(51) Int. Cl.

| F25B 31/02 | (2006.01) |
| F04B 39/12 | (2006.01) |
| F04B 53/22 | (2006.01) |
| F04B 39/14 | (2006.01) |
| H02K 5/22 | (2006.01) |

(52) U.S. Cl.
CPC ............ *F25B 31/02* (2013.01); *F04B 39/121* (2013.01); *F04B 39/14* (2013.01); *F04B 53/22* (2013.01); *F25B 2400/071* (2013.01); *F25B 2400/077* (2013.01); *F25B 2500/12* (2013.01); *F25B 2500/13* (2013.01); *H02K 5/225* (2013.01)

(58) Field of Classification Search
CPC ...... F04B 39/121; F04B 53/001; F04B 53/16; F04B 39/14; F04B 53/22; H01R 13/5213; F25B 2400/077; F25B 2500/12; F25B 2500/13; H02K 5/225
USPC ............ 439/135, 136; 174/50–50.52, 66, 67, 174/138 F; 417/410.1, 422, 902
See application file for complete search history.

(56) References Cited

U.S. PATENT DOCUMENTS

| 4,640,985 A * | 2/1987 | Martin ..................... H01F 27/02 |
| | | 174/138 F |
| 2010/0196175 A1 * | 8/2010 | Bedell ...................... F04B 39/12 |
| | | 417/410.5 |

FOREIGN PATENT DOCUMENTS

| CN | 1566647 | 1/2005 |
| KR | 10-2004-0035915 | 4/2004 |
| KR | 10-0764126 | 9/2007 |
| KR | 10-2011-0023162 | 3/2011 |

\* cited by examiner

*Primary Examiner* — Alexander Comley
(74) *Attorney, Agent, or Firm* — Staas & Halsey LLP

(57) ABSTRACT

A compressor and an air conditioner having the compressor, and a protective cover of a connecting terminal of the compressor is installed while spaced apart from a barrier of the connecting terminal. The protective cover is additionally provided with a noise preventing member. Vibration generated from the compressor is delivered to the protective cover via the barrier, but as the protective cover is provided to be spaced apart from the barrier, the vibration is delivered to the barrier through the noise preventing member. Thus, regardless of the state of vibration of the compressor, noise being generated by the protective cover is minimized.

12 Claims, 8 Drawing Sheets

COMPRESSOR AND AIR CONDITIONER HAVING THE SAME

CROSS-REFERENCE TO RELATED APPLICATIONS

This application claims the benefit of Japanese Patent Application No. 2013-235574, filed on Nov. 14, 2013, in the Japan Patent Office and Korean Patent Application No. 10-2014-0093417, filed on Jul. 23, 2014, in the Korean Intellectual Property Office, the disclosures of which are incorporated herein by reference.

BACKGROUND

1. Field

Embodiments of the present disclosure relate to a compressor, and more particularly, a cover provided to protect a connecting terminal.

2. Description of the Related Art

In general, an air conditioner is an apparatus configured to adjust indoor air by use of refrigeration cycle, and is capable of intaking hot air of the indoor space so as to heat-exchange the hot air by use of low-temperature refrigerant so that cool air may be discharged into the indoor space so as to cool the indoor space, or on the contrary, is capable of intaking low-temperature air of an indoor space so as to heat-exchange with respect to high-temperature refrigerant so that heated air may be discharged into the indoor space so as to warm the indoor space.

The air conditioner is capable of cooling or warming an indoor space by use of refrigeration cycle configured to circulate through a compressor, a condenser, an expansion valve, and an evaporator in forward direction or backward direction. The compressor is configured to provide a high-temperature, high-pressure refrigerant in a gaseous state, and the condenser is configured to provide a room-temperature, high-pressure refrigerant in a liquid state. The expansion valve is configured to decompress the room-temperature, high-pressure refrigerant in the liquid state, and the evaporator is configured to evaporate the decompressed refrigerant into a low-temperature gaseous state.

Recently, changes to the vacuum state of the compressor are significant, as the compressor is provided to operate at a high speed to conserve energy of the air conditioner. Accordingly, noise may occur at a protective cover of a connecting terminal through which a power is supplied to the compressor when a barrier and the protective cover come in contact with respect to each other at an unexpected position.

SUMMARY

Therefore, it is an aspect of the present disclosure to provide a compressor having a protective cover capable of preventing noise regardless of a vacuum state of the compressor, and an air conditioner having the same.

Additional aspects of the disclosure will be set forth in part in the description which follows and, in part, will be apparent from the description, or may be learned by practice of the disclosure.

In accordance with one aspect of the present disclosure, a compressor includes a case, a connecting terminal, a barrier and a protective cover. The connecting terminal may be protruded to an outside of the case. The barrier may surround the connecting terminal. The protective cover may be mounted at the barrier. The protective cover may be mounted while spaced apart from a front end surface and a side surface of the barrier.

The protective cover may include at least one noise preventing member installed so as to face the front end surface and the side surface of the barrier.

A distance from a surface at which the protective cover and the barrier are in contact to a surface corresponding to the noise preventing member may be longer than a distance from a surface at which the protective cover and the barrier are in contact to the front end surface of the barrier.

The noise preventing member may be provided with one unit thereof installed at an upper portion of the protective cover, and with two units thereof installed while being spaced apart from each other at a lower portion of the protective cover.

The protective cover may further include at least one installation member extended from one end of the protective cover so as to be mounted at the barrier.

The noise preventing member may be provided at a side of the protective cover at which the installation member is positioned.

The barrier may be provided with a step protruded at a side thereof at which the installation member is supported such that the protective cover is installed at the barrier.

In accordance with another aspect of the present disclosure, an air conditioner having a compressor includes a case, a connecting terminal, a barrier and a protective cover. The connecting terminal may be protruded to an outside of the case. The barrier may surround the connecting terminal. The protective cover may be mounted at the barrier. The protective cover may be mounted while spaced apart from the barrier such that delivery of vibration being generated at the compressor is reduced.

The protective cover may include at least one noise preventing member installed so as to correspond to a front end surface and a side surface of the barrier.

The noise preventing member may be provided such that the vibration of the compressor is delivered to the protective cover though the noise preventing member.

The protective cover may be mounted such that one end surface and a side surface of the barrier, which are inserted into an inner side the protective cover at the time of when the protective cover is coupled to the barrier, are provided while spaced apart from the noise preventing member.

The protective cover may further include at least one installation member provided at one end portion of the protective cover as to be mounted at the barrier.

The noise preventing member may be provided at a side of the protective cover at which the installation member is positioned.

The barrier may be provided with a step being protruded while corresponding to one end portion of the installation member such that the one end portion of the installation member is installed by being supported by the barrier

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
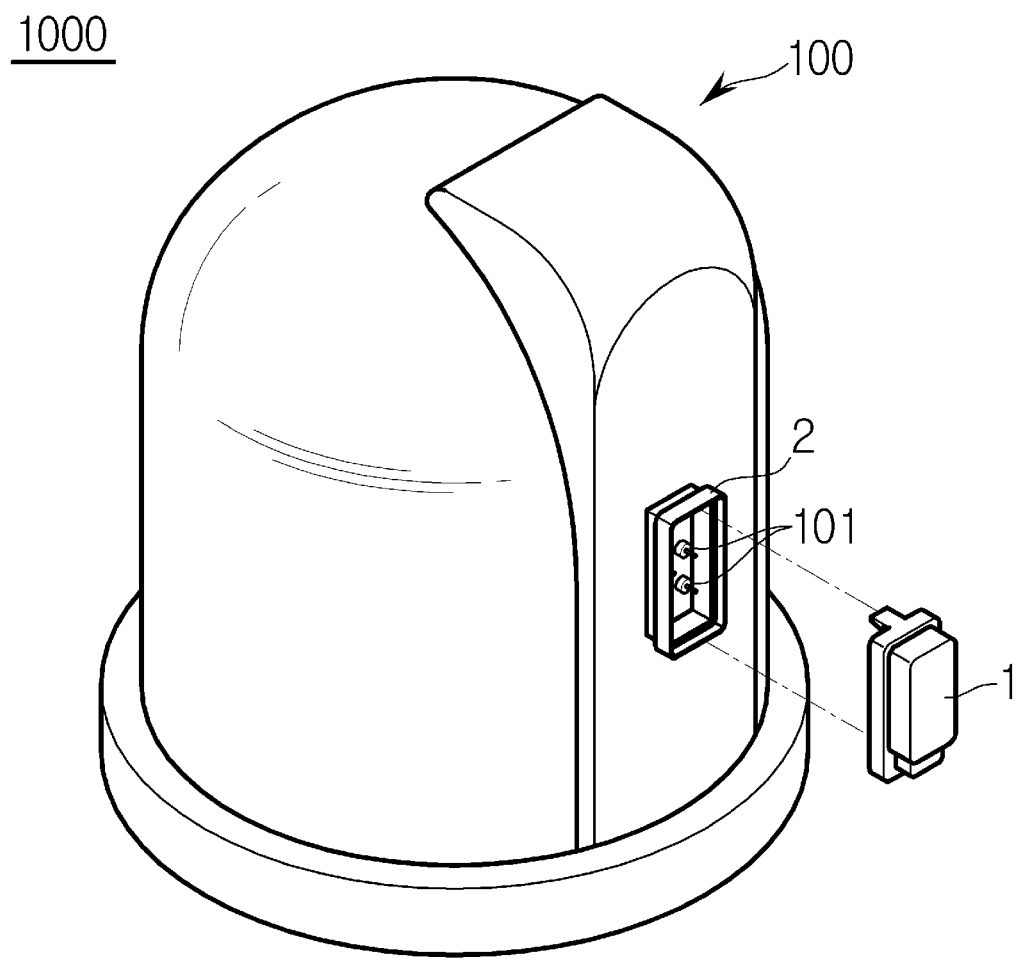
FIG. 1 is a perspective view of a compressor in accordance with one embodiment of the present disclosure.

Reference will now be made in detail to a protective cover 1 of a compressor 1000 in accordance with the embodiments of the present disclosure, examples of which are illustrated in the accompanying drawings, wherein like reference numerals refer to like elements throughout.

Figure 7:
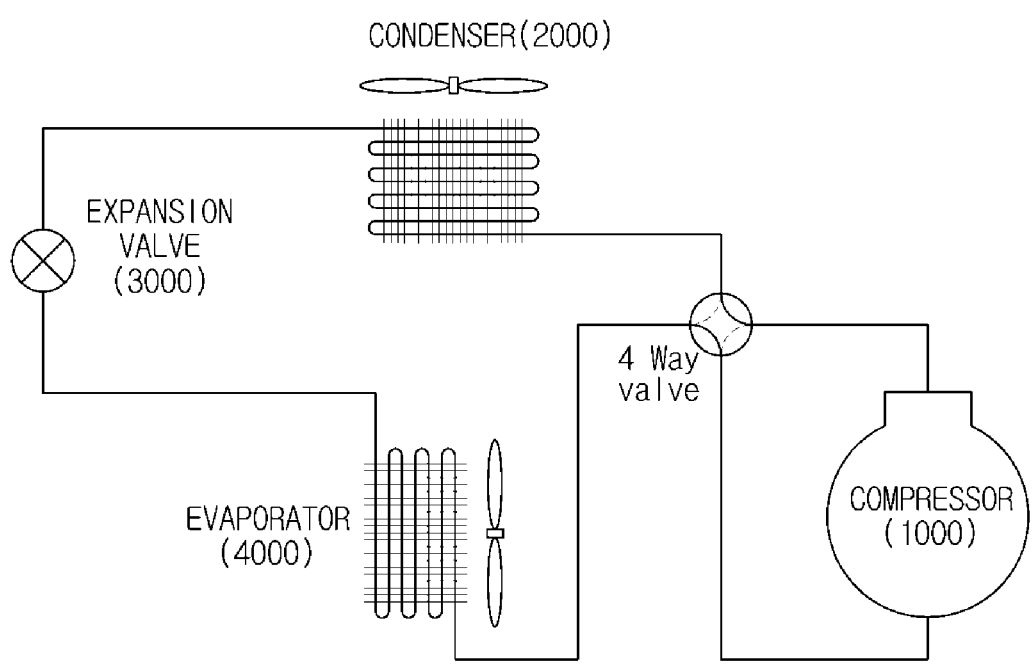
FIG. 7 is a drawing illustrating an air conditioning system of an air conditioner in accordance with one embodiment of the present disclosure.
Figure 8:
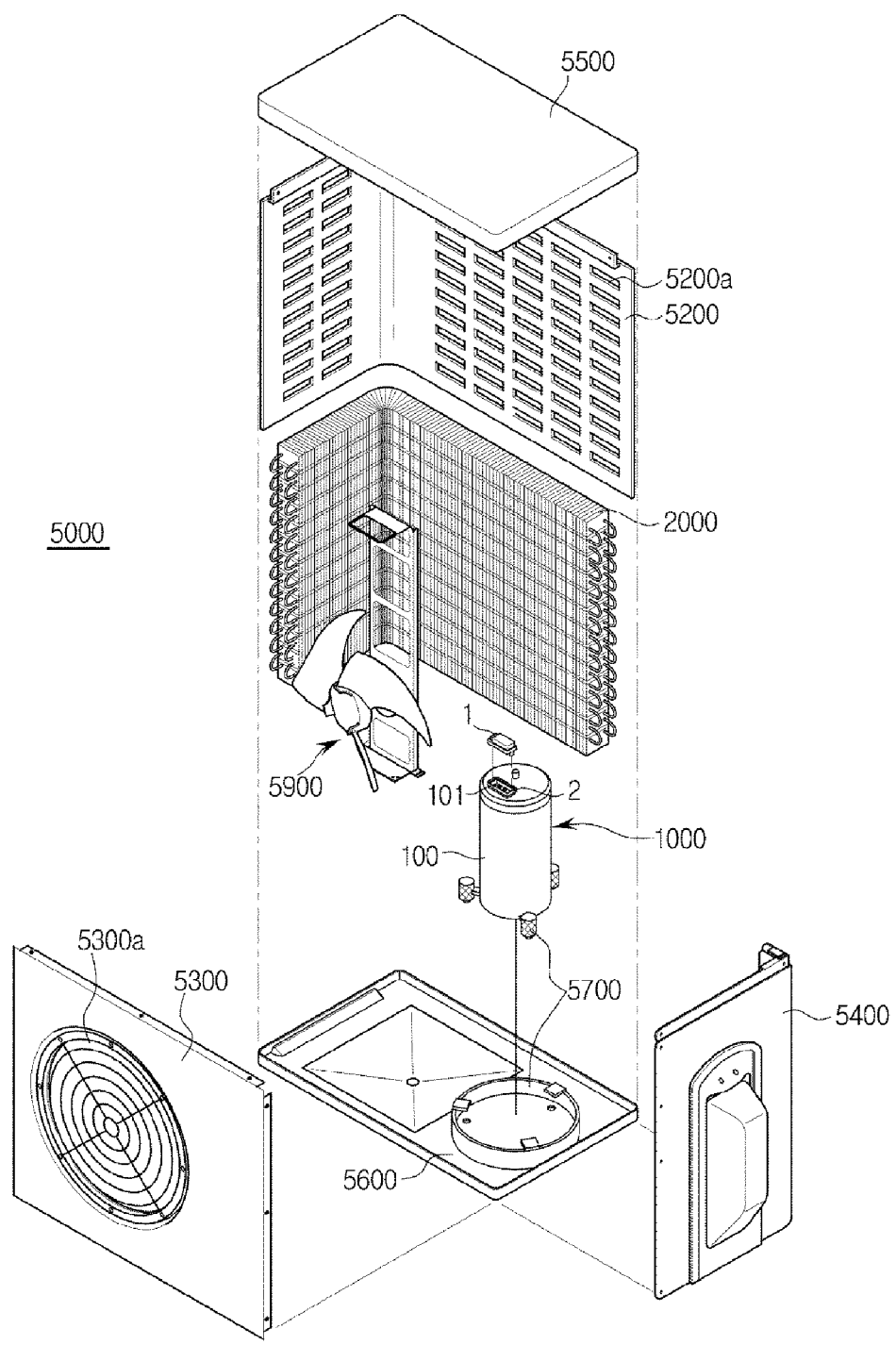
FIG. 8 is an exploded perspective view showing a schematic structure of an outdoor unit of the air conditioner in accordance with one embodiment of the present disclosure.

The protective cover 1 in accordance with the embodiment of the present disclosure is mounted at a barrier 2 surrounding a connecting terminal 101 that is installed at a case 100. Here, the case 100 is provided as to protect a motor (not shown) of the compressor 1000. Here, the compressor 1000 may be used in an air conditioner as shown in FIG. 7 and FIG. 8. However, the compressor 1000 is not limited to an air conditioner and may also be used in a refrigerator or other device.

Figure 2:
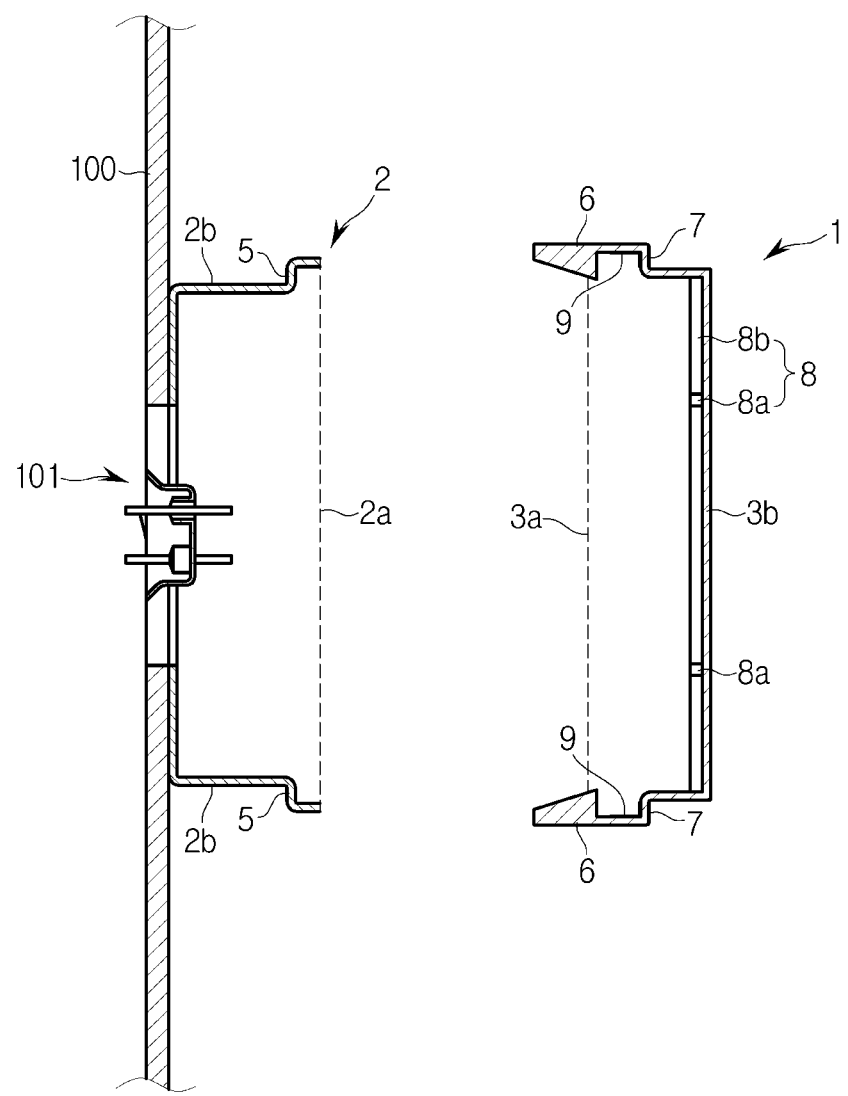
FIG. 2 is a cross-sectional view of a state of a protective cover of the compressor in accordance with one embodiment of the present disclosure being separated.
Figure 3:
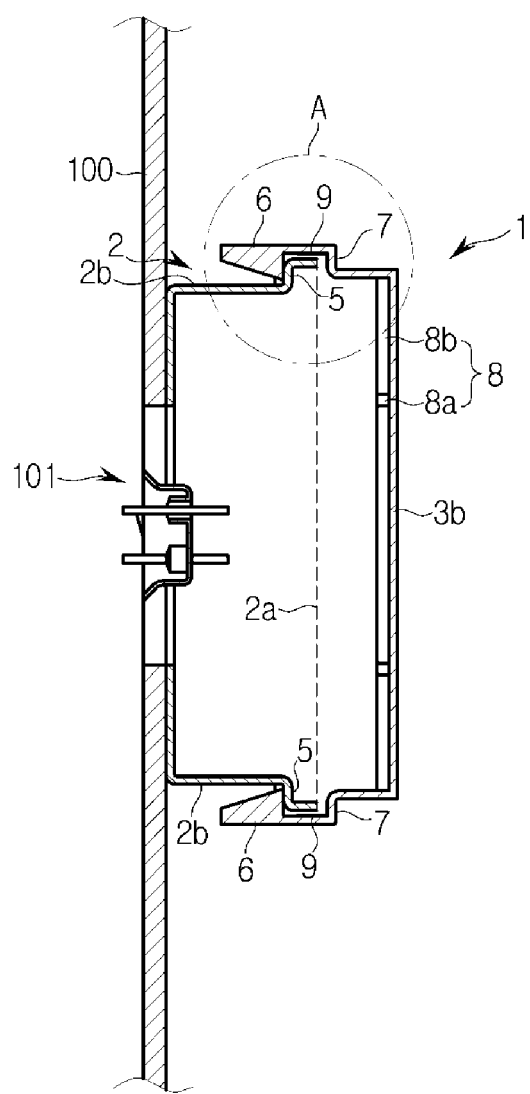
FIG. 3 is a cross-sectional view of a state of the protective cover of the compressor in accordance with one embodiment of the present disclosure being mounted.

As shown in FIG. 1 to FIG. 3, the barrier 2 is formed of metallic material such as stainless steel, and is disposed as to surround the connecting terminal 101, and the barrier 2 is fixed to the case 100 by use of a screw.

The connecting terminal 101 according to the embodiment of the present disclosure is provided at a lateral side of the case 100, but the present disclosure is not limited hereto. For example, as illustrated in FIG. 7 and FIG. 8, the connecting terminal 101 may be provided at an upper portion of the case 100.

In the embodiment of the present disclosure, a step 5 is provided at a side surface 2b of the barrier 2 as an attachment method by using a protrusion configured to attach the protective cover 1 to the step 5 of the side surface 2b of the barrier 2.

As shown in FIG. 3, the protective cover 1 is provided with the shape of a casing having one surface thereof open, and configured to be mounted to cover the barrier 2 while facing a front end surface 2a of the barrier 2, and an installation member 6 configured to attach the protective cover 1 to the barrier 2 is installed at an end portion 3a of the opening of the protective cover 1.

The installation member 6 is provided with a locking portion 6a installed at the end portion 3a, a front end portion 6b disposed at an opposite side with respect to the locking portion 6a, and a side portion 6c tapered while having a width that reduces as it extends from the locking portion 6a to the front end portion 6b. One unit of the installation member 6 is installed at an upper portion while two units of the installation member 6 are installed at a lower portion.

The protective cover 1 is mounted at the barrier 2, as the locking portion 6a is in contact with respect to the step 5 at the time of when the installation member 6 is mounted at the step 5.

The protective cover 1 is provided with a protective cover step 7 at a position between the open end portion 3a and a lower portion 3b in which the open end portion has an opening width larger than that of the lower portion 3b.

In addition, a plurality of ribs 8 are installed at an inner surface of the protective cover 1. The plurality of ribs 8 include horizontal ribs 8a and vertical ribs 8b.

As shown in FIG. 1 to FIG. 6, three units of noise preventing member 9 are installed at the protective cover 1 to face the front end surface 2a of the barrier 2 and the side surface 2b of the barrier 2 in a state that the protective cover 1 is mounted at the barrier 2.

Hereinafter, the noise preventing member 9 will be described in detail. In addition, hereinafter, a side to which the protective cover 1 is mounted at the barrier 2 is referred to as a front, and a side to which the protective cover 1 is separated from the barrier 2 is referred to as a rear.

Figure 5:
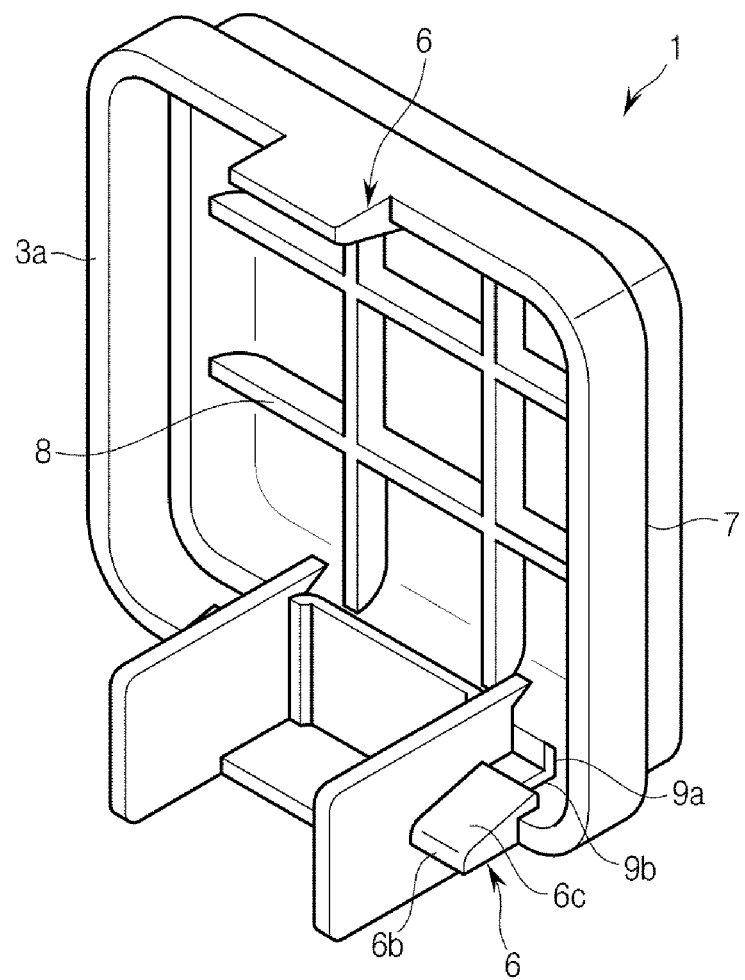
FIG. 5 is a perspective view of the protective cover of the compressor in accordance with one embodiment of the present disclosure.
Figure 6:
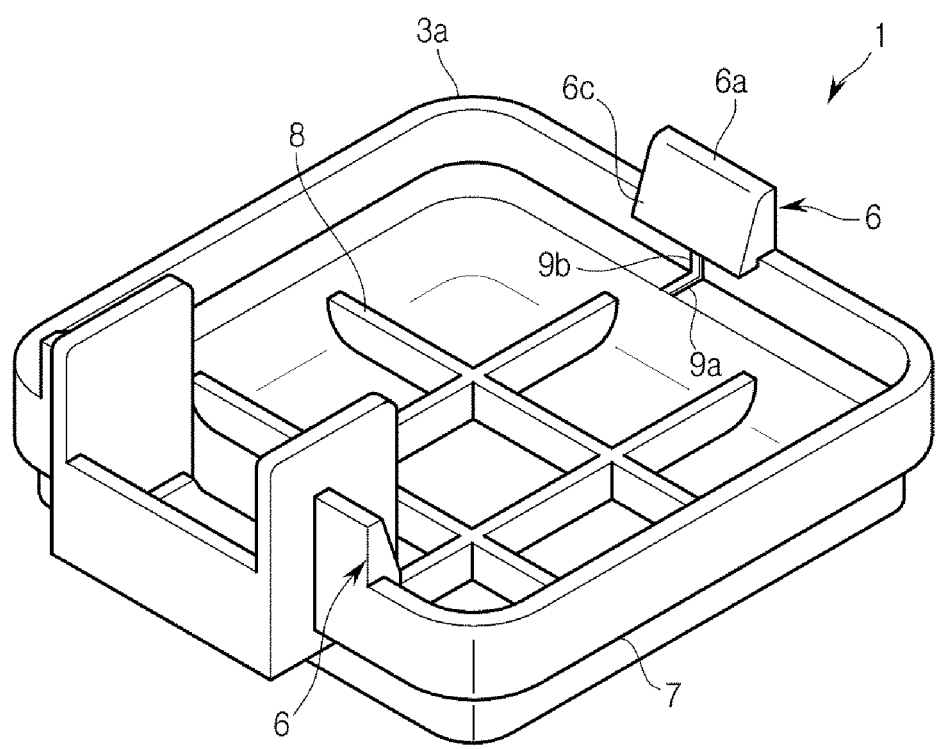
FIG. 6 is a perspective view of the protective cover of the compressor in accordance with one embodiment of the present disclosure.

As shown in FIG. 5 and FIG. 6, the noise preventing member 9 is positioned at the rear of the installation member 6, and is provided at the front of the step 7 that is installed on the protective cover 1.

The noise preventing member 9 is provided with a barrier front end facing portion 9a disposed along the step 7 of the protective cover 1 so as to face the front end surface 2a of the barrier 2, and with a barrier side surface facing portion 9b integrally formed with the barrier front end facing portion 9a and disposed along the side surface of the protective cover 1 so as to face the side surface 2b of the barrier 2.

Both resin portions of each of the barrier front end facing portion 9a and the barrier side surface facing portion 9b are formed through molding. The thickness of the noise preventing member 9 of the embodiment of the present disclosure is preferred to be about 0.2 mm.

Figure 4:
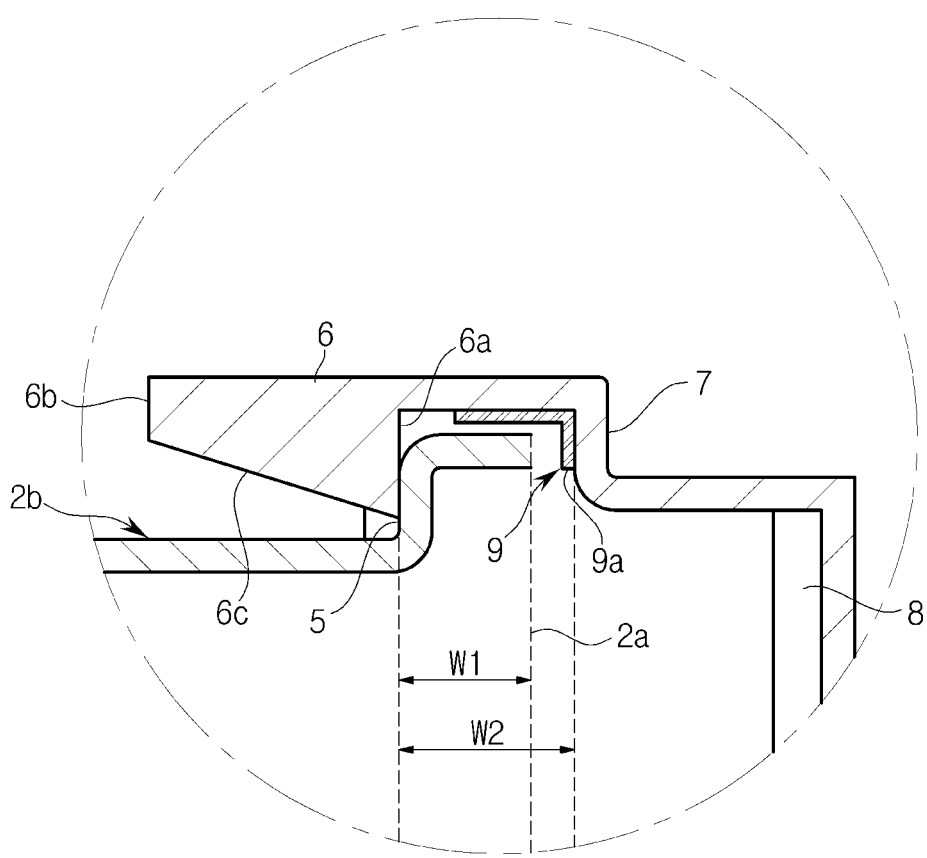
FIG. 4 is an enlarged cross-sectional view illustrating portion A of FIG. 3.

As shown in FIG. 4, in a state when the protective cover 1 is mounted at the barrier 2, a distance 'W1' between a contact surface, at which the locking portion 6a of the installation member 6 and the step 5 of the barrier 2 make contact with each other, and an end section of the barrier 2 is provided to be shorter than a distance 'W2' between the contact surface and an inner surface of the step 7 of the protective cover 1.

In the embodiment of the present disclosure, the distance 'W1' is preferably provided to be about 4 mm, and the distance 'W2' is preferably provided to be about 6 mm.

As shown in FIG. 3, in a state when the protective cover 1 is mounted at the barrier 2, the barrier 2 is not in contact with the barrier front end facing portion 9a or the barrier side surface facing portion 9b.

As the compressor 1000 is driven, the barrier 2 and the noise preventing member 9 are in contact by the vibration being delivered at the barrier 2 from the compressor 1000.

Depending on the state of vibration of the compressor 1000, the state of vertical movement with respect to the case 100 or the state of parallel movement with respect to the case 100 may be present. However, in either state, the barrier front end facing portion 9a comes into contact with the front end surface 2a of the barrier 2 or the barrier side surface facing portion 9b comes into contact with the side surface 2b of the barrier 2.

That is, by providing the noise preventing member 9 to face the front end surface 2a of the barrier 2 and the side surface 2b of the barrier 2, at the time of when the compressor 1000 is vibrated, the protective cover 1 makes contact with respect to the barrier 2 by means of the noise preventing member 9, and thus noise may be prevented regardless of the state of vibration of the compressor 1000.

At this time, as the noise preventing member 9 becomes a point at which the vibration is delivered from the barrier 2 to the protective cover 1, and thus vibratory force is reduced when compared to a case of the vibration being directly delivered from the barrier 2 to the protective cover 1.

In addition, the displacement amount of vibration of the barrier 2 may be reduced by use of the noise preventing member 9, and thus the vibratory force may be further weakened.

The noise preventing member 9 is installed at three locations, and thus the noise preventing member 9 and the barrier 2 may be provided as to stably correspond with respect to each other.

The protective cover 1 is having the shape of a case provided with one surface thereof open, and is provided with the at least one installation member 6 provided at the open end portion 3*a* so as to be mounted at the barrier 2. The noise preventing member 9 is installed near the installation member 6, and thus by providing the noise preventing member 9 near the installation member 6, which is a restraining point at which the protective cover 1 is mounted at the barrier 2, the barrier 2 and the noise preventing member 9 may be further closely disposed with respect to each other when the compressor 1000 is vibrated.

In addition, vibration may be reduced according to each compressor 1000, by changing the shape of the noise preventing member 9 in accordance with the state of vibration or the wavelength range that is intended to reduce.

The installation member 6 is provided with the side portion 6*c* which is taped to have a width getting reduced while extending from the locking portion 6*a* to the front end portion 6*b*, and thus by changing the inclination angle of the taper, the contact area of the locking portion 6*a* and the step 5 is changed, the interlocking force between the barrier 2 and the protective cover 1 may be freely changed.

Hereinafter, reference will be made in detail to an air conditioner having a compressor provided with the improved protective cover 1 in accordance with the embodiments of the present disclosure, examples of which are illustrated in the accompanying drawings, wherein like reference numerals refer to like elements throughout.

FIG. 7 is provided to illustrate an air conditioning system of an air conditioner, and the air conditioning system of the air conditioner in accordance with one embodiment of the present disclosure is structured with the compressor 1000, a condenser 2000, an expansion valve 3000, and an evaporator 4000.

The condenser 2000 is configured to condense and liquefy high-temperature, high-pressure refrigerant of a gaseous state into high-temperature, high-pressure refrigerant of a liquid state, by heat-exchanging the high-temperature, high-pressure refrigerant of the gaseous state, which is discharged from the compressor 1000, with respect to surrounding air and cooling water so as to release the heat of the refrigerant of the gaseous state.

The expansion valve 3000 is configured to convert high-temperature, high-pressure refrigerant in a liquid state, which is liquefied at the condenser 2000, into low-temperature, low-pressure refrigerant by means of expansion.

The evaporator 4000 is configured to convert low-temperature, low-pressure refrigerant in a liquid state, which is passed through the expansion valve 3000, into low-temperature, low-pressure refrigerant of a gaseous state.

The compressor 1000 is referred to as a structure configured to perform a role of a pump to circulate refrigerant at the air conditioning system, and is configured to perform a role to increase pressure up to saturated pressure, which is considered a condensation temperature, so that the low-temperature, low-pressure refrigerant in a gaseous state evaporated at the evaporator may be liquefied at the condenser by means of intaking.

The air conditioner in accordance with the present disclosure is referred to as a detachable-type air conditioner provided with an indoor unit and an outdoor unit thereof being separately detached and installed, and the compressor 1000 and the condenser 2000 are provided at an outdoor unit 5000 while the expansion valve 3000 and the evaporator 4000 are provided at an indoor unit. Refrigerant may flow while circulating the outdoor unit 5000 and the indoor unit through a pipe connecting the indoor unit and the outdoor unit 5000.

However, the air conditioner in accordance with the present disclosure is not limited hereto, and may be applied to an integral-type air conditioner integrally provided with an indoor unit and an outdoor unit.

FIG. 8 is an exploded perspective view showing a schematic structure of the outdoor unit of the air conditioner in accordance with one embodiment of the present disclosure.

The outdoor unit 5000 of the air conditioner is structured with a rear plate 5200 installed at a rear portion, a front plate 5300 coupled into a front portion of the rear plate 5200, side plates 5400 installed at side portions, a top plate 5500 installed at an upper portion, and a base plate 5600 at which various compartments are installed. The rear plate 5200 is configured to form a plurality of intake holes 5200*a*, and a discharging unit 5300*a* is formed at the front plate 5300 such that outside air is passed through an inside the outdoor unit 5000.

Then, the compressor 1000 configured to compress refrigerant delivered from an indoor heat exchanger of the indoor unit, the condenser 2000 configured to heat-exchange refrigerant while installed at a front of the rear plate 5200, and a draft apparatus 5900 configured to intake and outtake outside air are installed at the outdoor unit 5000.

Here, the compressor 1000, along with an anti-vibration apparatus 5700 configured to support the compressor 1000 and configured to reduce vibration and noise of the compressor 1000, is installed at the base plate 5600.

The compressor 1000 in accordance with one embodiment of the present disclosure includes the barrier 2 provided at an upper portion thereof with the connecting terminal 101 and configured to wrap around the connecting terminal 101, and the protective cover 1 mounted at the barrier 2.

The structures of the protective cover 1 and the barrier 2 above are identical with respect to the structures of the protective cover 1 and the barrier 2 that are illustrated and described on FIG. 1 to FIG. 6.

In accordance with the embodiments of the present disclosure, noise can be prevented regardless of the state of vibration of a compressor.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A compressor, comprising: a case; a connecting terminal protruded to an outside of the case; a barrier surrounding the connecting terminal; and a protective cover mounted at the barrier, wherein the protective cover is mounted while spaced apart from a front end surface and a side surface of the barrier, the protective cover comprises a step formed between an open end portion and an inner surface of the protective cover, and at least one noise preventing member, the at least one noise preventing member includes a barrier front end facing portion disposed along the step so as to face the front end surface of the barrier, and a barrier side surface facing portion formed with the barrier front end facing portion and disposed along a side surface of the protective cover so as to face the side surface of the barrier, and when the protective cover is mounted at the barrier, the barrier is not in contact with the barrier front end facing portion or the barrier side surface facing portion.

2. The compressor of claim 1, wherein:
the at least one noise preventing member is provided with one unit thereof installed at an upper portion of the protective cover, and with two units thereof installed while being spaced apart from each other at a lower portion of the protective cover.

3. The compressor of claim 1, wherein:
the protective cover further comprises at least one installation member extended from the open end portion of the protective cover so as to be mounted at the barrier.

4. The compressor of claim 3, wherein:
the at least one noise preventing member is provided at a side of the protective cover at which the installation member is positioned.

5. An air conditioner having a compressor, the compressor comprising:
a case;
a connecting terminal protruded to an outside of the case;
a barrier surrounding the connecting terminal; and
a protective cover mounted at the barrier,
wherein the protective cover is mounted while spaced apart from the barrier such that delivery of vibration being generated at the compressor is reduced, and
the protective cover comprises
a step formed between an open end portion and an inner surface of the protective cover, and
at least one noise preventing member including a barrier front end facing portion disposed along the step so as to face a front end surface of the barrier, and a barrier side surface facing portion formed with the barrier front end facing portion and disposed along a side surface of the protective cover so as to face a side surface of the barrier, wherein when the protective cover is mounted at the barrier, the barrier is not in contact with the barrier front end facing portion or the barrier side surface facing portion.

6. The air conditioner of claim 5, wherein:
the at least one noise preventing member is provided such that the vibration of the compressor is delivered to the protective cover through the at least one noise preventing member.

7. The air conditioner of claim 5, wherein:
the protective cover further comprises at least one installation member provided at one end portion of the protective cover as to be mounted at the barrier.

8. The air conditioner of claim 7, wherein:
the at least one noise preventing member is provided at a side of the protective cover at which the installation member is positioned.

9. A compressor, comprising: a case; a connecting terminal protruded to an outside of the case; a barrier surrounding the connecting terminal; and a protective cover mounted at the barrier, the protective cover having the shape of a casing having an open end portion, an inner surface and a side surface, the protective cover being configured to be mounted to cover the barrier while facing a front end surface of the barrier, wherein the protective cover comprises an installation member formed at the open end portion to attach the protective cover to the barrier, a step formed at a position between the open end portion and the inner surface, and at least one noise preventing member installed so as to face the front end surface and a side surface of the barrier, and wherein the at least one noise preventing member includes a barrier front end facing portion disposed along the step so as to face the front end surface of the barrier, and a barrier side surface facing portion formed with the barrier front end facing portion and disposed along the side surface of the protective cover so as to face the side surface of the barrier, and when the protective cover is mounted at the barrier, the barrier is not in contact with the barrier front end facing portion or the barrier side surface facing portion.

10. The compressor of claim 9, wherein the thickness of the at least one noise preventing member is about 0.2 mm.

11. The compressor of claim 9, wherein the protective cover further comprises a plurality of ribs installed at the inner surface of the protective cover.

12. The compressor of claim 11, wherein the plurality of ribs include horizontal ribs and vertical ribs.

* * * * *